United States Patent
Chin et al.

(10) Patent No.: US 12,554,829 B2
(45) Date of Patent: Feb. 17, 2026

(54) FENCING OFF CLUSTER SERVICES BY USING IDENTITY AND ACCESS MANAGEMENT TO CONTROL ACCESS TO SHARED STORAGE RESOURCES

(71) Applicant: Dell Products L.P., Round Rock, TX (US)

(72) Inventors: Lan Chin, Sunnyvale, CA (US); George Mathew, Belmont, CA (US); Niharika Avasarala, Pleasanton, CA (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/636,586

(22) Filed: Apr. 16, 2024

(65) Prior Publication Data

US 2025/0322060 A1 Oct. 16, 2025

(51) Int. Cl.
 *G06F 21/45* (2013.01)
(52) U.S. Cl.
 CPC .................................. *G06F 21/45* (2013.01)
(58) Field of Classification Search
 CPC .............................. G06F 21/45; G06F 9/5077
 USPC ................................................. 726/1–2, 18
 See application file for complete search history.

(56) References Cited

U.S. PATENT DOCUMENTS

| | | | |
|---|---|---|---|
| 7,134,138 B2* | 11/2006 | Scherr | G06F 21/80 713/185 |
| 7,168,088 B1* | 1/2007 | Matena | G06F 11/2033 709/219 |
| 8,977,888 B1* | 3/2015 | Bafna | G06F 11/1415 714/4.11 |
| 11,397,794 B1* | 7/2022 | Baghani | G06F 21/44 |
| 2011/0179231 A1* | 7/2011 | Roush | G06F 11/1425 711/147 |
| 2019/0215164 A1* | 7/2019 | Hamann | H04L 9/0894 |
| 2019/0278494 A1* | 9/2019 | Dev | G06F 13/1668 |
| 2025/0286728 A1* | 9/2025 | Brodsky | H04L 9/0825 |

\* cited by examiner

*Primary Examiner* — Lizbeth Torres-Diaz
(74) *Attorney, Agent, or Firm* — Dergosits & Noah LLP; Todd A. Noah

(57) ABSTRACT

A system prompts a key manager to provide access keys, to access resources stored by a shared storage, for a group of services hosted by nodes of a cluster. The group of services receive the access keys from the key manager. The first service in the group of services uses the first access key to create a signing key, which is used to sign a request, which is sent to the shared storage, which enables access to the first resource. The system detects the second service in the group of services becoming unavailable for the cluster. The system informs the key manager that the second service is removed from the groups of services, which prompts the key manager to invalidate use of the access key provided for the second service, after which the first service continues using the first access key to access the first resource.

20 Claims, 7 Drawing Sheets

FIG. 5B

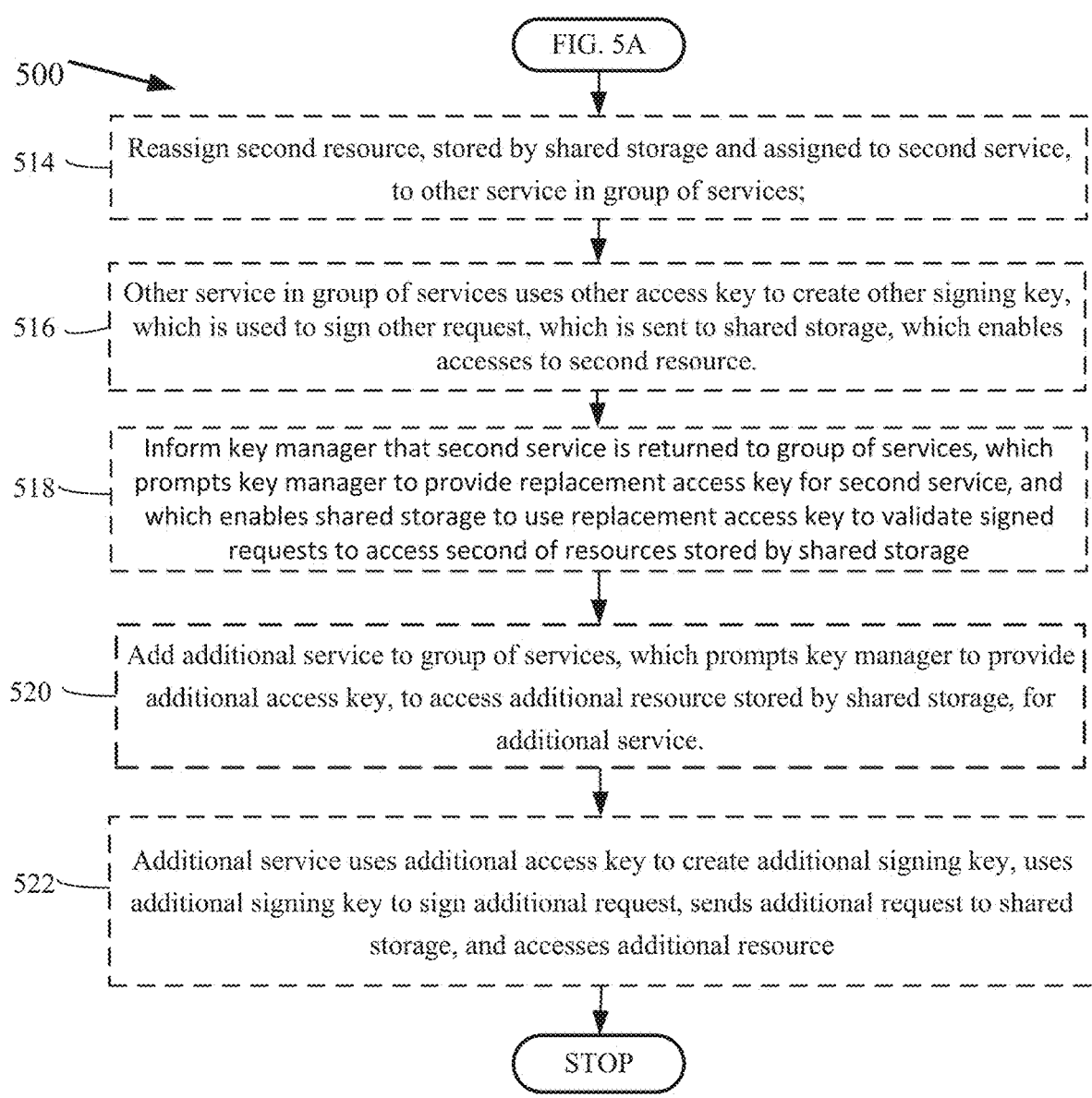

FENCING OFF CLUSTER SERVICES BY USING IDENTITY AND ACCESS MANAGEMENT TO CONTROL ACCESS TO SHARED STORAGE RESOURCES

TECHNICAL FIELD

This disclosure relates to storing digital information, and more particularly, to fencing off cluster services by using identity and access management to control access to shared storage resources.

BACKGROUND

A data user may copy data in a data center to one or more remote sites, which may be in one or more cloud locations, to have copies of data in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB file attachment and stores small references to the one stored instance for the 99 subsequent instances.

When being copied from or to a data storage system, a data file or a data object may be divided into data segments. A data deduplication system can receive data segments, compare these received data segments against previously stored data segments, identify which received data segments are unique because they have not been previously stored, and store the unique data segments. When a comparison identifies a received data segment as a duplicate of a data segment that has previously been stored as unique, a data deduplication system replaces the duplicate data segment with a small reference that points to the previously stored data segment.

A deduplication system typically does not determine whether a data segment is a duplicate data segment or a unique data segment by directly comparing this data segment against previously stored data segments which were previously determined to be unique data segments. For example, a deduplication system would waste system resources by directly comparing thousands of bytes in each of many data segments which were formed from a client's data object or data file against thousands of bytes in millions of data segments which have already been identified and stored as unique data segments. Instead, a fingerprint that uniquely identifies a data segment may be generated for each data segment, such as by applying a SHA-1 hash function to create a unique 20-byte fingerprint for each data segment. Consequently, a deduplication system can conserve system resources by more efficiently comparing 20-byte fingerprints for each of many data segments formed from a client's data object or data file against 20-byte fingerprints for millions of data segments which have already been identified and stored as unique data segments.

A scale-out can be the addition of more nodes to a data file system, such as scaling out from a system that includes one web server to a system that includes three web servers. As computer prices drop and computer performance increases, system architects can configure hundreds of small computers in a cluster to obtain aggregate computing capabilities that often exceed that of computers based on a single traditional processor.

Unlike grid computers, a cluster has each node (a computer used as a server) set to perform the same task, controlled and scheduled by software. The components of a cluster are usually connected to each other through fast local area networks, with each node running its own instance of an operating system. In most circumstances, all of the nodes use the same type of hardware and the same type of operating system. Clusters are usually deployed to improve performance and availability over that of a single computer, while typically being more cost-effective than single computers of comparable speed or availability.

FIG. 1 depicts a clustered system 100 that includes clients 101, 102, and 103, which use a load balancer 110 to access a cluster 120 of nodes 121, 122, and 123, which host services 131, 132, and 133, which use sets of keys 141, 142, and 143, and which are connected via a communication network 150, to access resources stored in a shared storage 160, which may be a S3 object storage that serves as a backend for storing data. The cluster 120 may lose the heartbeat signal from the node 122, and be unable to confirm communication with the that the node 122, or the node 122 may otherwise fail or be partitioned out of the cluster 120. In response to such situations for the node 122, a cluster manager, which may be hosted by the cluster 120, may reassign the ownership of a resource, which was assigned to the service 132 hosted by the node 122, to the service 131 hosted by the node 121 instead, which enables the cluster 120 to maintain availability of the reassigned resource.

For data consistency purposes, there can be only one current owner of a resource, such that the cluster 120 needs to ensure that only the service 131 hosted by the node 121 can write to the reassigned resource. While the node 122 may be unavailable from a cluster membership perspective via the "east-to-west" communication network 150 between the nodes 121, 122, and 123, the clients 101, 102, and 103 may still be able to write to the node 122 via the "north-to-south" communication network between the clients 101, 102, and 103 and the nodes 121, 122, and 123. Therefore, the cluster 120 cannot communicate with the node 122 to ensure the service 132 hosted by the node 122 will have stopped writing to the reassigned resource, or that the shared storage 160 that stores the reassigned resource only accepts writes from the service 131 hosted by the node 121 to the reassigned resource and no longer accepts writes from the service 132 hosted by the node 122 to the reassigned resource. On traditional data storage systems, where the Small Computer System Interface (SCSI) protocol is visible to cluster nodes, SCSI reservations may be used to "fence off" or restrict the input and the output for any node, but such fencing off of cluster components is unavailable for scaled out systems, such as object storage used by cloud storage platforms. Even if the node 122 can be fenced off, the cluster 120 would still need to ensure that any fencing solution would let the other services 131 and 133 and hosted by any of the other nodes 121 and 123 free to continue to work and access their resources without interruption.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 5B is a continuation of the block diagram of FIG. 5A illustrating an example method for fencing off cluster services by using identity and access management to control access to shared storage resources, according to one or more embodiments of the disclosure.

DETAILED DESCRIPTION

Figure 1:
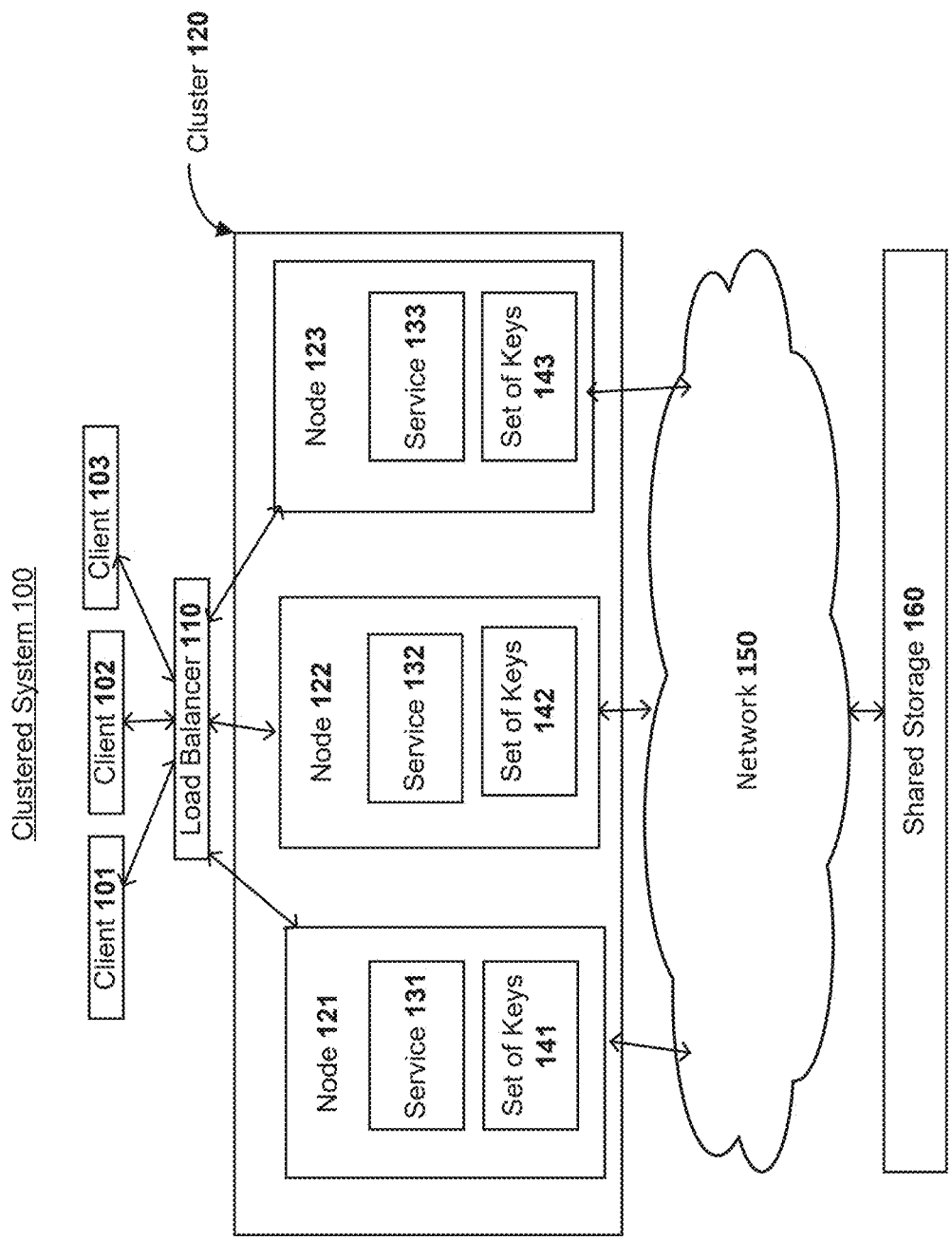
FIG. 1 is a block diagram illustrating a cluster of nodes and shared storage, according to one or more embodiments of the disclosure.

In some embodiments, a system (and a computer program product and a method) is described for fencing off cluster services by using identity and access management to control access to shared storage resources. A system prompts a key manager to provide access keys, to access resources stored by a shared storage, for a group of services hosted by nodes of a cluster. The group of services receive the access keys from the key manager. The first service in the group of services uses the first access key to create a signing key, which is used to sign a request, which is sent to the shared storage, which enables access to the first resource. The second service in the group of services becomes unavailable for the cluster. The system informs the key manager that the second service is removed from the groups of services, which prompts the key manager to invalidate use of the access key provided for the second service, after which the first service uses the first access key to access the first resource.

For example, a cluster manager prompts an identity and access management key manager to generate and then provide individualized secret access keys for each of the services in a group of services hosted by the nodes of a cluster, thereby prompting a shared storage to use the individualized secret access keys to validate signed requests to access the resources stored by the shared storage. The group of the 4 deduplication and compression services receive the 4 individualized secret access keys provided by the identity and access management key manager. The first deduplication and compression service using its individualized secret access key to create its individualized signing key, which is used to sign a request, which is sent to the object storage, which enables access to the first set of similarity groups. The cluster manager detects that the second node that hosts the second deduplication and compression service of the group of the deduplication and compression services is unavailable for the cluster. The cluster manager informs the key manager that the second deduplication and compression service is removed from the group of 4 deduplication and compression services, which prompts the key manager to invalidate any use of the individualized secret access key provided for the second deduplication and compression service, such as the use of the individualized secret access key to create the individualized signing key that the second deduplication and compression service uses to sign requests to access any resources stored by the object store. Consequently, when the object store receives any request from the second deduplication and compression service to access the second set of similarity groups, the object store denies the request. The first deduplication and compression service continue using its individualized signing key, which was created from its individualized secret access key, to sign requests to access resources stored by the shared storage and access the first set of similarity groups, after the key manager invalidated the use of the individualized secret access key provided for the second deduplication and compression service.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In some embodiments, such a system may be provided within an operating environment. An example of such an operating environment is further described below with reference to FIG. 2. However, in general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 2:
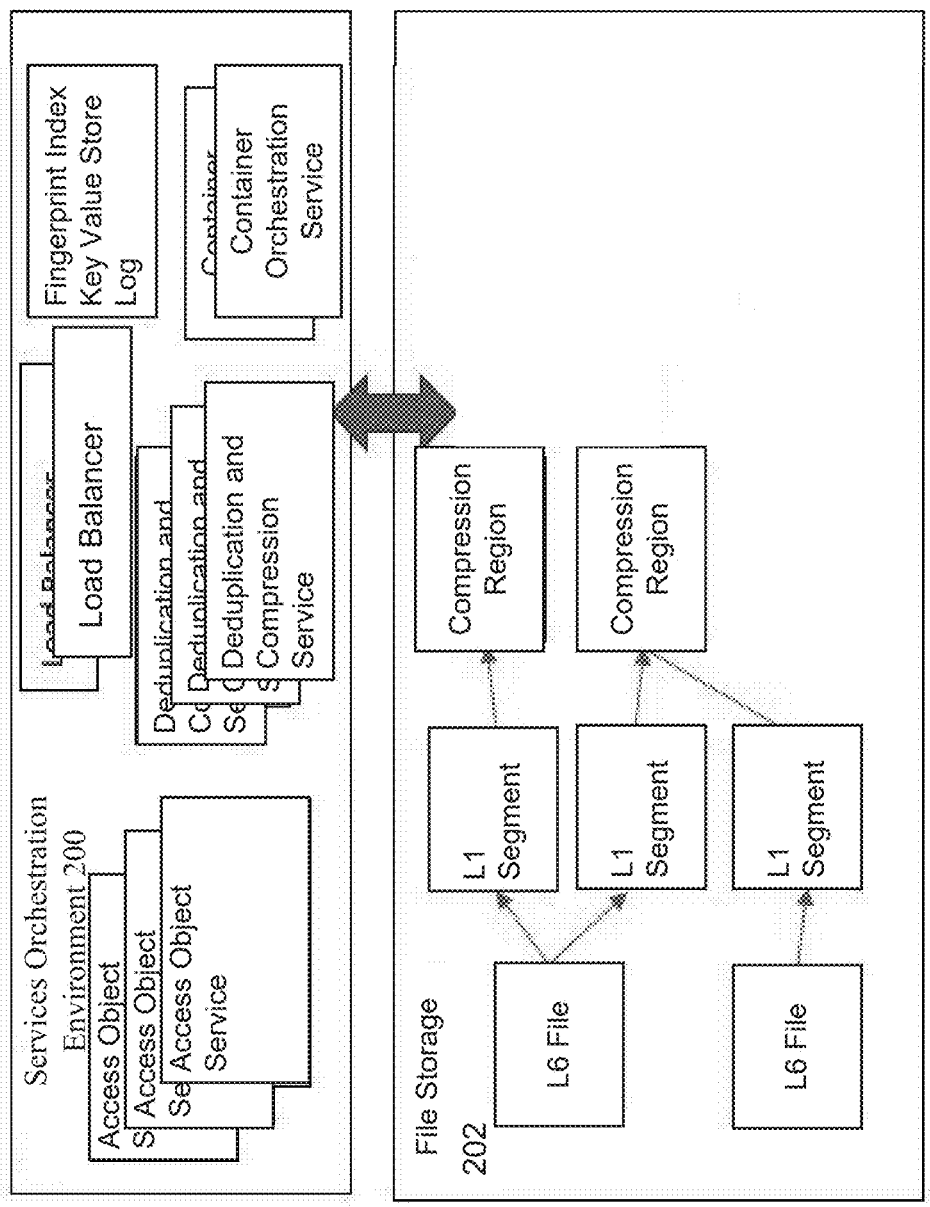
FIG. 2 is a block diagram illustrating parts of an example operating environment for fencing off cluster services by using identity and access management to control access to shared storage resources, according to one or more embodiments of the disclosure.

As shown in FIG. 2, the services orchestration environment 200 (such as a Kubernetes cloud computing environment) may provide for the deployment of distinct types of services. The services orchestration environment 200 may enable the deployment of services for fencing off cluster services by using identity and access management to control access to shared storage resources, and for conditional storage in the file storage 202, which may be the shared storage 202.

A distributed file system can use Identity and Access Management (IAM) functionality in object storage to prevent selected distributed services from accessing reassigned resources on object storage. Object storage providers have a service called the Identity and Access Management (IAM) service, which specifies WHO (IAM users, IAM roles, and IAM groups) CAN ACCESS (permissions with IAM policies) WHAT (resources such as S3 buckets, etc.). Identity and Access Management services provide authentication and authorization for cloud services, and are typically used by cloud information technology (IT) administrators to manage which cloud users can access which cloud resources, whereas this disclosure describes a method that uses Identity and Access Management for a different purpose, to prevent or "fence off" a distributed service from accessing the reassigned resource which the distributed service had been accessing.

Services must be granted permissions using IAM policies which specify the permissions to access resources. An IAM user represents a user or an application and two key pairs (an access key and a secret key) which can be assigned at any given time, while an IAM group is a collection of users. A policy can be attached to a group of users to enable the same permission for multiple users. The IAM service is typically used by cloud IT administrators to set up policies for which cloud users will access what cloud resources.

The object storage is accessible using the S3 HTTP (Hypertext Transport Protocol) with methods such as "PUT" to write an object, and "GET" to read an object, etc. The HTTP headers and uniform resource locator (URL) are hashed using secret access keys to calculate a signature. This signature is included in the HTTP header so the object storage provider can verify access to the object storage. These access keys consist of two keys: one to identify the "user" and an associated "secret" key. In a clustered system, the object storage will use access keys to authenticate the S3 operations received from services to access the object storage.

A signature calculation process such as AWS v4 (Authenticating Requests AWS Signature Version 4) —Amazon Simple Storage Service may be used. Although originally designed for Amazon Web Services (AWS), many cloud storage platforms use the S3 Application Programming Interface (API), which is an object storage service that offers industry-leading scalability, data availability, security, and performance. The S3 API is used as a security key-based authentication mechanism to authenticate requests to access resources. Each request to access resources has an access key identifier, and each access key identifier has a secret access key. The signature is calculated by forming a canonical string using various elements of the S3 API such as the uniform resource locator (URL), access key and HTTP header. The secret key is used to hash this string to form the signature.

Figure 3:
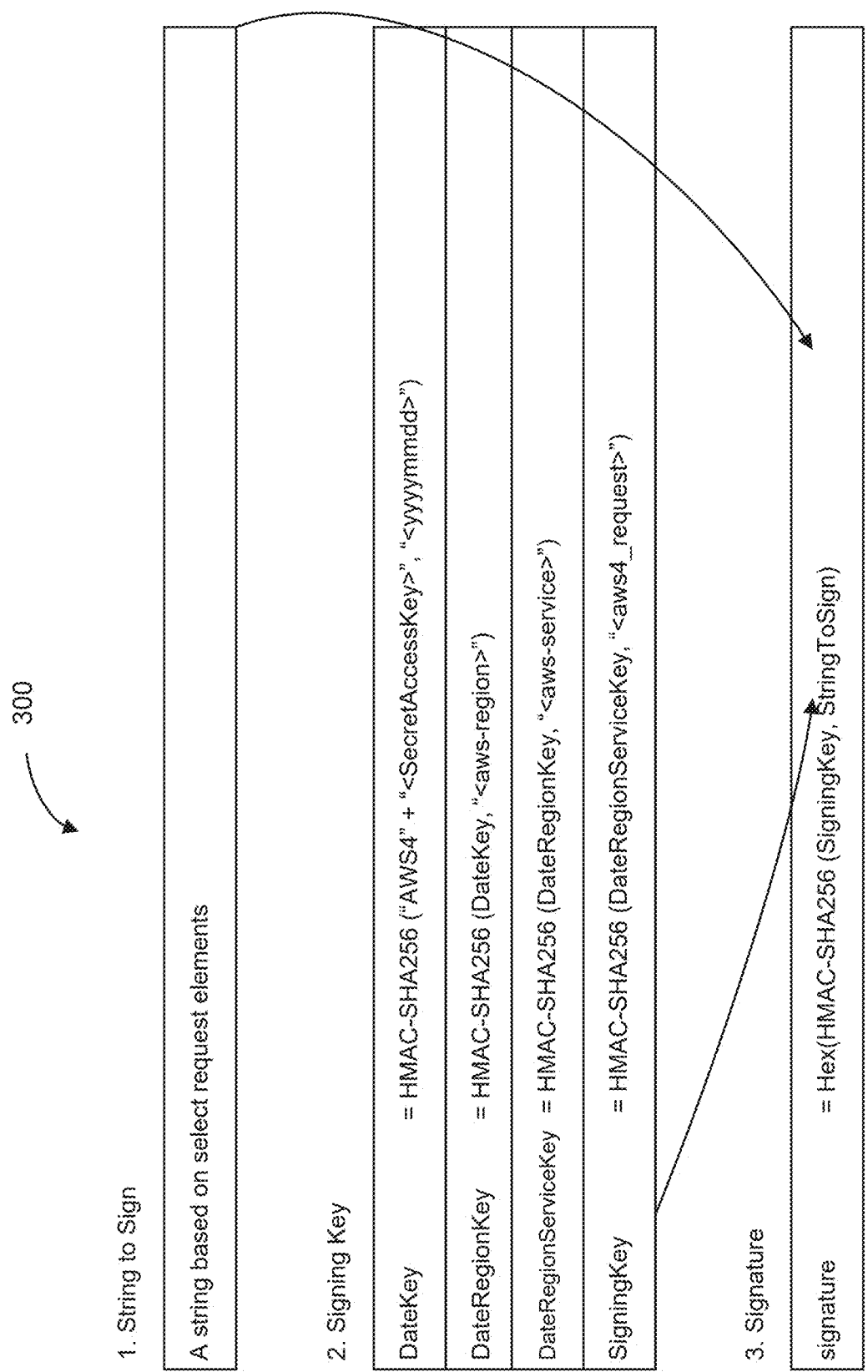
FIG. 3 depicts block diagrams illustrating the generation of signing keys for fencing off cluster services by using identity and access management to control access to shared storage resources, according to one or more embodiments of the disclosure.

FIG. 3 depicts block diagrams illustrating the generation of signing keys for accessing resources stored by shared storage. As depicted by the equations 300, the S3 API hashes a date and a secret access key to generate a date key, hashes the date key and a region to generate a date-region key, hashes the date-region key and a service to generate a date-region-service key, and then hashes the date-region-service key and a request to generate a signing key. Then the signing key and the string to sign are hashed to generate the signature for a signed string which is a request to access a resource. The object storage provider will also use the previously generated secret access key and the signed request to generate the request's expected signature, which is used to validate the request's actual signature, and if the expected signature does not match the actual signature, the S3 request is denied (HTTP 403 permission denied error).

To guarantee data consistency, only one service should be allowed to access a resource, such as objects in a particular set of similarity groups. A deduplication object service accesses data in multiple deduplication domains called similarity groups, wherein each similarity group has a collection of objects and is owned by a deduplication object service. When a deduplication object service is partitioned off, such as when the deduplication object service is no longer reachable by other nodes in the cluster, ownership of the deduplication object service's similarity groups will be transferred to another deduplication object service.

When a service is removed out of cluster membership, due to a network partition or unavailability of the service, this service should not be allowed access to any of the objects in the service's resources, such as the set of similarity groups, to guaranteed that the service cannot add/delete/modify any of the file system data stored as objects in the object store. The system should fence off this service before the ownership of resources will be transferred to other services, because the original service is no longer the owner. However, only the partitioned/unavailable service should be fenced off and other services should continue to work. Disallowing a service to add/modify/delete when the service leaves the cluster should be done before the resources are redistributed to other services.

As an example, to guarantee data consistency in a cluster 120, there should be only one service that can access each resource, such as a set of similarity groups, that is owned by the service. In this example, FIG. 1 depicts that the services 131-133 have their corresponding keys 141-143 that enables them to access only their corresponding S3 resources which are stored in the shared storage 160 and are owned by the services 131-133: When the service 132 is removed from membership in the cluster 120, a simple solution would be to delete all the keys 141-143 and then create new keys for the services 131 and 133 that remain available in the cluster 120, which requires updating all keys for any membership change in the cluster 120. Instead of updating all the keys 141-143 for all the services 131-133, the goal is how to manage the existing keys such that when the service 132 is partitioned out, access to the resource that belongs to the service 132 should be denied, but the keys 141 and 143 should remain valid for all the other services 131 and 133 that remain available in the cluster 120.

The process of adding keys when a service joins the cluster 120, or deleting keys when a service leaves the cluster 120 is managed by a cluster manager, when the membership change in the cluster 120 is detected, and before the new cluster membership is sent to other services. This ensures that before the resource, such as a set of similarity groups, is reassigned, the corresponding updates for the keys are already complete.

Figure 4:
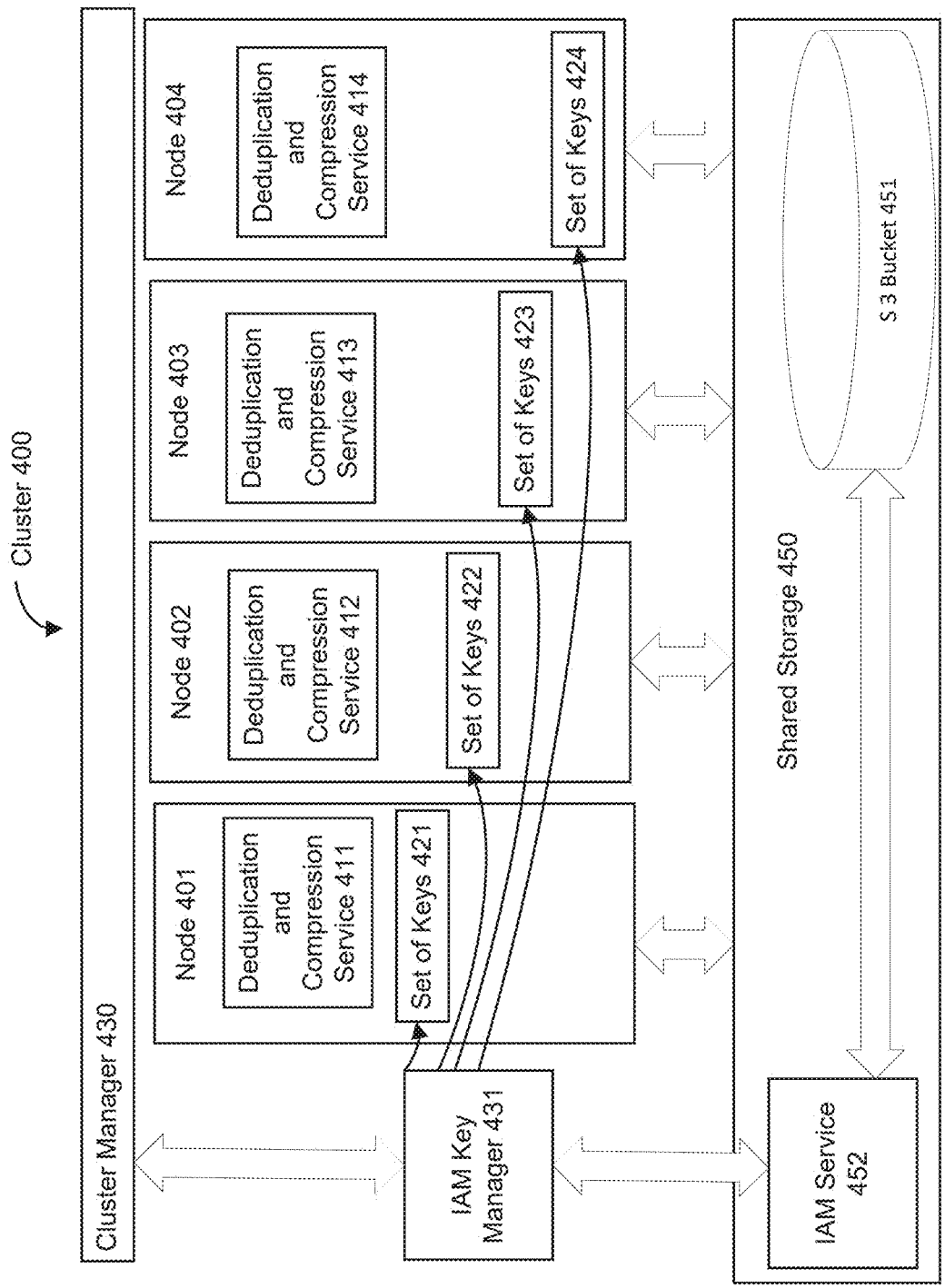
FIG. 4 is a block diagram illustrating cluster node services and shared storage for fencing off cluster services by using identity and access management to control access to shared storage resources, according to one or more embodiments of the disclosure.

FIG. 4 is a block diagram illustrating a clustered system that includes a cluster 400, which has nodes 401-404, services, 411-414, sets of keys 421-424, and a cluster manager 430 and an identity and access management key manager 431, which access a shared storage 450, that includes a S3 bucket 451, and an identity and access management service 452. The cluster 400 and the shared storage 450 can fence off the cluster services 411-414 by using identity and access management to control access to shared storage resources, according to one or more embodiments of the disclosure. The cluster manger 430 use IAM users and groups in a novel way to fence off any of the services 411-414 that has its membership removed from the cluster 400, but without having to update any of the sets of keys 421-424 for the other services 411-414 that are still in the cluster 400. The cluster manger 430 prompts the IAM key manager 431 to create an IAM user for each of the services 411-414 in the cluster 400, create an IAM group that includes the IAM users created for the services 411-414, and then create an IAM policy for the IAM group that specifies the permissions that each of the IAM users/services 411-414 in the IAM group have to access the specific resources stored in the shared storage 450. Then the IAM key manager 431 generates and provides to the service 411-414 whatever access keys are required for the permitted access to the resources stored by the shared storage 450 and specified by the policies for the groups.

In an example of adding a service, if the fourth deduplication and compression service 414 is a new service that is being added to the cluster 400, the cluster manager 430 will prompt the identity and access management key manager 431 to create an IAM user for the fourth deduplication and compression service 414, and expand the IAM group membership for the group of deduplication and compression services 411-413 to include the new IAM user/fourth deduplication and compression service 414. The IAM key manager 431 will respond by creating a unique IAM user for the fourth deduplication and compression service 414, adding the new IAM user to the group of deduplication and compression services 411-413, and generating a unique access key 424 for the fourth deduplication and compression service 414, based on the access keys that are required for the members of the group of deduplication and compression services 411-413 to access the resources in the S3 bucket 451 as specified by the permissions identified by the policy for this group, and then providing these newly generated unique access keys 424 to the fourth deduplication and compression service 414. The cluster manager 430 will add the fourth deduplication and compression service 414 to the cluster 400, after which the fourth deduplication and compression service 414 can use the newly created unique access keys 424 to access its assigned fourth set of similarity groups. The cluster manager 430 will inform other services about the addition of the fourth deduplication and compression service 414 only after the IAM user creation is done.

In an example of removing a service, if the first deduplication and compression service 411 is partitioned out of the cluster 400, the cluster manager 430 prompts the IAM keys manager 431 to remove the corresponding IAM-user from the group of users for the deduplication and compression services 411-414, which prompts the IAM keys manager 431 to invalidate the set of keys 421 for the first deduplication and compression service 411, which can no longer access the S3 bucket 451. Since the IAM user for the first deduplication and compression service 411 is no longer part of the IAM group of users for the deduplication and compression services 412-414, any S3 operations from the first deduplication and compression service 411 will fail with a permission denied error, such as HTTP 403. However, the deduplication and compression services 412-414 can continue to use their sets of keys 422-424 for access to the S3 bucket 451 because their sets of keys 422-424 are associated with their IAM-users who are still in the group of IAM users for which the policy specifies still have permission to access the S3 bucket 451, such that no key refresh is needed, and the IAM keys manager 431 does not need to update the sets of keys 422-424 for the deduplication and compression services 412-414. The cluster manager 430 will ensure that the corresponding IAm user is removed before giving the new service membership to any other service.

Figure 5A:
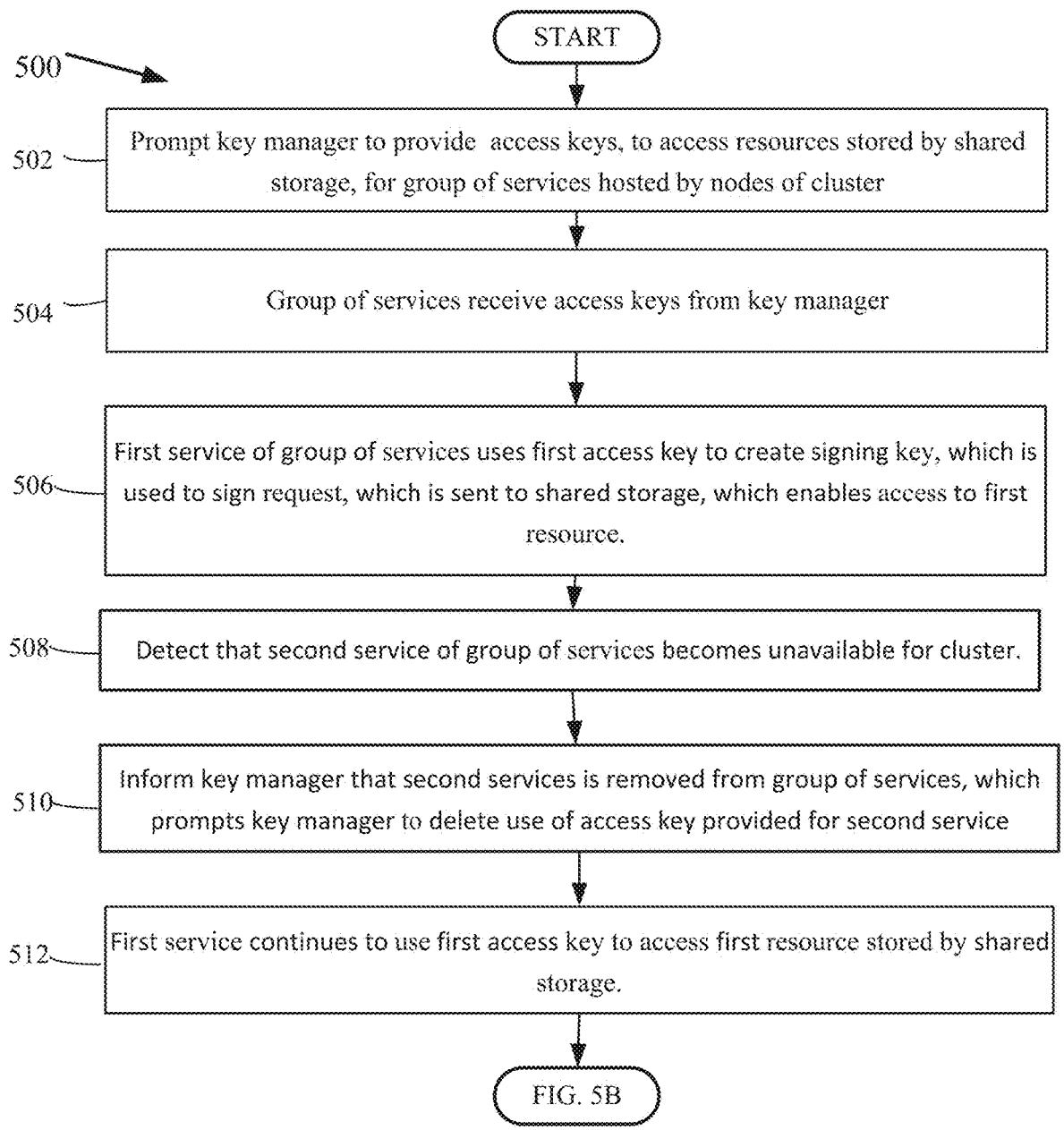
FIG. 5A is a block diagram illustrating an example method for fencing off cluster services by using identity and access management to control access to shared storage resources, according to one or more embodiments of the disclosure.

FIGS. 5A and 5B depict a flowchart 500 that illustrates a method for fencing off cluster services by using identity and access management to control access to shared storage resources, under an embodiment. Flowchart 500 depicts method acts illustrated as flowchart blocks 502-534 for certain steps involved in the cluster 400, the nodes 401-404, the services 411-414, the sets of keys 421-424, the cluster manager 430, and the shared storage 450 of FIG. 4.

A key manager is prompted to provide access keys, to access resources stored by a shared storage, for a group of services hosted by nodes of a cluster, block 502. Prompting the key manager to provide access keys can prompt the shared storage to use the access keys to validate requests to access the resources stored by the shared storage. The system prompts a key manager to create individualized secret access keys for services in a cluster. For example, and without limitation, this can include the cluster manager 430 prompting the identity and access management key manager 431 to generate and then provide individualized secret access keys 421-424 for each of the services 411-414 in a group of services hosted by the nodes 401-404 of the cluster 400, thereby prompting the shared storage 450 to use the individualized secret access keys to validate signed requests to access the resources stored by the shared storage 450.

A key manager can be a component that controls digital entities that provide the means of obtaining or retrieving information stored in a computer's memory. An access key can be a digital entity that provides the means of obtaining or retrieving information stored in a computer's memory. A resource can be a supply of assets that may be drawn upon to function effectively. A shared storage can be the retention in a computer of retrievable data constructs which may be used by multiple entities in the computer. A group can be a collection of items that are considered or classed together. A service can be a component that provides functions. A node can be a computer within a network of other computers that are able to receive, process, and send information. A cluster can be a set of loosely or tightly connected computers that work together so that, in many respects, they are viewed as a single system. A request can be an instruction to a computer to provide information or perform another function.

A policy associated with the group of services can specify permissions for the services in the group of service to access specific resources stored by the shared storage. For example, a system administrator defined a policy that specifies the group of the deduplication and compression services 411-414 have permission to access their 4 corresponding sets of similarity groups. A policy can be a course or principle of action adopted by a service in relation to a resource. A permission can be a consent or an authorization.

The resource may be a set of similarity groups, a local fingerprint index, a namespace, a local post-deduplication log, or a range of similarity group identifiers, and the shared storage may be an object storage, a distributed key value store, and/or a distributed log. For example, the deduplication and compression service 411 accesses a local post-deduplication log stored by the shared storage 450.

A set of similarity groups can be collections of data segments that resemble other collections of data segments. A local fingerprint index can be an ordered list of bit strings which were mapped from larger data objects or data files, which uniquely identify the larger data objects or data files, and which is only available for use in one part of a program. A namespace can be a set of identifiers that are used to refer to distinct types of objects while avoiding identifier collision between multiple objects that use the same identifier. A local post-deduplication log can be a record of information generated after the elimination of redundant information, and which is only available for use in one part of a program. A range of similarity group identifiers can be a set of numbers between lower and upper limits of a scale which refers to how much collections of data segments resemble other collections of data segments. An object storage can be the retention in a computer of retrievable data constructs that that may be used by the computer. A distributed log can be a record which is available for use in multiple parts of a system. A distributed key value store can be the retention in a computer of digital entities that enable the retrieval of data constructs that that may be used by multiple entities in the computer.

After prompting a key manager to provide access keys for a group of services, the group of services receive the access keys from the key manager, block 504. The system receives the individualized secret access keys from the key manager for each of the services in the group of services. By way of example and without limitation, this can include the group of the deduplication and compression services 411-414 receiving the sets of individualized secret access keys 421-424 provided by the identity and access management key manager 431.

Following receipt of access keys by a group of services, a first service of the group of services uses a first of the access keys to create a signing key, which is used to sign a request, which is sent to the shared storage, which enables access to the first of the resources, block 506. The system uses individualized secret access keys for services to access corresponding resources stored in the object store. In embodiments, this can include the first deduplication and compression service 411 using its individualized secret access key 421 to create its individualized signing key 421, which is used to sign a request, which is sent to the object storage 450, which enables access to the first set of similarity groups. A signing key can be a digital entity that provides a means of authorization.

Having received access keys, a second service of the group of services is detected as becoming unavailable for the cluster, block 508. The system detects services becoming unavailable for the cluster. For example, and without limitation, this can include the cluster manager 430 detecting that the second node 402 that hosts the second deduplication and compression service 412 of the group of services 411-414 is partitioned out of the cluster 400. Unavailable can be not able to be used or obtained.

The cluster manager 430 may receive a Kubernetes' report that the second deduplication and compression service 412 is unavailable for the cluster 400 of nodes 401-404, or is partitioned out of the cluster 400. For example, after the second deduplication and compression service 412 stopped cluster communications, the cluster manager 430 identified the subsequent loss of a heartbeat communication as a cluster membership event.

In response to detecting that a second service of the group of services becomes unavailable for the cluster, the key manager is informed that the second services is removed from the group of services, which prompts the key manager to invalidate any use of an access key provided for the second service, block 510. The system invalidates any use of the secret access key provided to a service that becomes unavailable for the cluster. By way of example and without limitation, this can include the cluster manager 430 informing the identity and access management key manager 431 that the second deduplication and compression service 412 is removed from the group of deduplication and compression services 411-414. This information prompts the identity and access management key manager 431 to invalidate any use of the individualized secret access key 422 provided for the second deduplication and compression service 412, such as the use of the individualized secret access key 422 to create the individualized signing key 422 that the second deduplication and compression service 412 uses to sign requests to access any resources stored by the object store 450. Consequently, when the object store 450 receives any request from the second deduplication and compression service 412 to access the second set of similarity groups, the object store 450 denies the request.

After the key manager invalidates the access key provided for the second service, the first service continues to use the first of the access keys to access the first of the resources stored by the shared storage, block 512. The system has fenced off the service that is unavailable for the cluster, without affecting the other services' use of access keys to access any resources. In embodiments, this can include the first deduplication and compression service 411 continuing to use its individualized signing key 421, which was created from its individualized secret access key 421, to sign requests to access resources stored by the shared storage 450, and access the first set of similarity groups, after the identity and access management key manager 431 invalidated the uses of the individualized secret access key 422 provided for the second deduplication and compression service 412.

Following the invalidation of the use of the access key provided for the second service, the second of the resources, stored by the shared storage and assigned to the second service, is optionally reassigned to another service in the group of services, block 514. The system can reassign resources that were accessed by services that are no longer in a group of services. For example, and without limitation, this can include the cluster manager 430 reassigning the second set of similarity groups, which belonged to the second deduplication and compression service 412, which is no longer in the group of services 411-414, to a third deduplication and compression service 413, which is still in the group of services 411-414.

After reassigning a second resource, another service in the group of services optionally uses another access key to create another signing key, which is used to sign another request, which is sent to the shared storage, which enables access to the second resource, block 516. The system can access a reassigned resource via another service in the group of services. By way of example and without limitation, this can include the third deduplication and compression service 413 using another individualized secret access key 423, which the third deduplication and compression service 513 had already used to access the third set of similarity groups, to create another signing key 423, using the other signing key 423 to sign another request to access the second set of similarity groups, sending the other signed request to the object storage 450, and accessing the second set of similarity groups.

Following the second service being removed from the group of services, the key manager is optionally informed that the second service is returned to the group of services, which prompts the key manager to provide a replacement access key for the second service, and which enables the shared storage to use the replacement access key to validate signed requests to access a second of the resources stored by the shared storage, block 518. The system enables services that return to the cluster to access their records. In embodiments, this can include the cluster manager 430 informing the identity and access management key manager 431 that the second deduplication and compression service 412 is once again in the group of deduplication and compression services 411-414, which prompts the identity and access management key manager 431 to generate and provide a replacement individualized secret access key 422 for the second deduplication and compression service 412 to use to create a replacement signing key 422 to sign requests to access to the second set of similarity groups. The identity and access management key manager 431 generating and providing a replacement individualized secret access key 422 prompts the object storage 450 to use the replacement individualized secret access key 422 to validate signed requests to access resources, such as the second set of similarity groups. A signed request can be an authorized instruction to a computer to provide information or perform another function An additional service is optionally added to a group of services, which prompts a key manager to provide an additional access key, to access an additional resource stored by a shared storage, for the additional service, block 520. The system can add services to existing groups of services, and provide additional keys for the additional services. For example, and without limitation, this can include the cluster manager 430 adding the fourth deduplication and compression service 414 to the existing group of deduplication and compression services 411-413, which prompts the identify and access management key manager 431 to provide an additional access key, to access an additional resource stored by the object storage 450, for the fourth deduplication and compression service 414.

Having provided an additional access key, an additional service optionally uses the additional access key to create an additional signing key, uses the additional signing key to sign an additional request, sends the additional request to the shared storage, and accesses an additional resource, block 522. The system can add an additional service that access additional resources. By way of example and without limitation, this can include the fourth deduplication and compression service 414 receiving the additional individualized secret access key 424 from the identify and access management key manager 431, using the additional individualized secret access key 424 to create an additional signing key 424, using the additional signing key 424 to sign an additional request, sending the additional signed request to the shared storage 450, and accessing the fourth set of similarity groups.

Although FIGS. 5A and 5B depict the blocks 502-522 occurring in a specific order, the blocks 502-522 may occur in other orders. In other implementations, each of the blocks 502-522 may also be executed concurrently and/or in combination with other blocks and/or some blocks may be divided into a distinct set of blocks.

Exemplary Computing System

Figure 6:
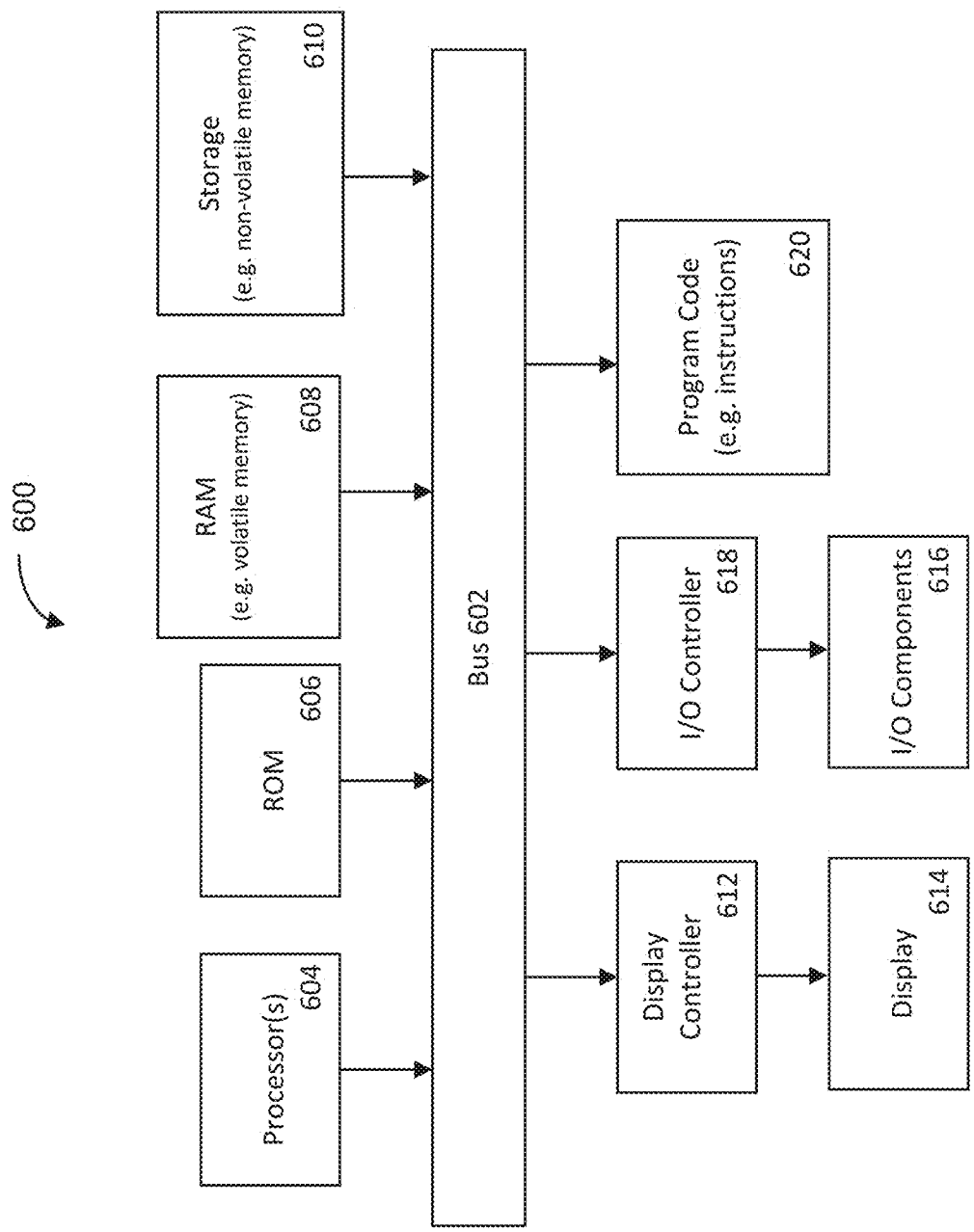
FIG. 6 is a block diagram illustrating a computing system for fencing off cluster services by using identity and access management to control access to shared storage resources, according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the system. It should be appreciated that storage 610 may be remote from the system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for fencing off cluster services based on shared storage access keys comprising: one or more processors; and
   a non-transitory computer readable medium storing a plurality of instructions, which when executed, cause the one or more processors to:
   prompt a key manager to provide access keys, to access resources stored by a shared storage, for a group of services hosted by nodes of a cluster;
   use, by a first service of the group of services, a first of the access keys to create a signing key, which is used to sign a request, which is sent to the shared storage, which enables access to a first of the resources, in response to the group of services receiving the access keys from the key manager;
   inform the key manager that a second service is removed from the groups of services, which prompts the key manager to invalidate use of an access key provided for the second service, in response to detecting that the second service of the group of services becomes unavailable for the cluster; and use, by the first service, the first of the access keys to access the first of the resources, after the key manager invalidates the use of the access key provided for the second service.

2. The system of claim 1, wherein prompting the key manager to provide access keys prompts the shared storage to use the access keys to validate signed requests to access the resources stored by the shared storage.

3. The system of claim 1, wherein a policy associated with the group of services specifies permissions for the services in the group of service to access specific resources stored by the shared storage.

4. The system of claim 1, wherein the plurality of instructions further causes the processor to:

reassign a second of the resources, stored by the shared storage and assigned to the second service, to another service in the group of services; and use, by the other service, another access key to create another signing key, which is used to sign another request to access the second of the resources, which is sent to the shared storage, which enables access to the second of the resources.

5. The system of claim 1, wherein the plurality of instructions further causes the processor to: inform the key manager that the second service is returned to the group of services, which prompts the key manager to provide a replacement access key for the second service, and which enables the shared storage to use the replacement access key to validate signed requests to access a second of the resources stored by the shared storage.

6. The system of claim 1, wherein the plurality of instructions further causes the processor to:

add an additional service to the group of services, which prompts the key manager to provide an additional access key, to access an additional resource stored by the shared storage, for the additional service; and use, by the additional service, the additional access key to create an additional signing key, which is used sign an additional request, which is sent to the shared storage, which enables access to the additional resource, in response to the additional service receiving the additional access key from the key manager.

7. The system of claim 1, wherein the resource comprises one of a set of similarity groups, a local fingerprint index, a namespace, a local post-deduplication log, or a range of similarity group identifiers, and the shared storage comprises at least one of an object storage, a distributed key value store, or a distributed log.

8. A computer program product comprising a non-transitory computer-readable medium having a computer-readable program code embodied therein to be executed by one or more processors, the program code including instructions to:

prompt a key manager to provide access keys, to access resources stored by a shared storage, for a group of services hosted by nodes of a cluster;

use, by a first service of the group of services, a first of the access keys to create a signing key, which is used to sign a request, which is sent to the shared storage, which enables access to a first of the resources, in response to the group of services receiving the access keys from the key manager;

inform the key manager that a second service is removed from the groups of services, which prompts the key manager to invalidate use of an access key provided for the second service, in response to detecting that the second service of the group of services becomes unavailable for the cluster; and use, by the first service, the first of the access keys to access the first of the resources, after the key manager invalidates the use of the access key provided for the second service.

9. The computer program product of claim 8, wherein prompting the key manager to provide access keys prompts the shared storage to use the access keys to validate signed requests to access the resources stored by the shared storage.

10. The computer program product of claim 8, wherein a policy associated with the group of services specifies permissions for the services in the group of service to access specific resources stored by the shared storage.

11. The computer program product of claim 8, wherein the program code includes further instructions to:

reassign a second of the resources, stored by the shared storage and assigned to the second service, to another service in the group of services; and use, by the other service, another access key to create another signing key which is used to sign another request to access the second of the resources, which is sent to the shared storage, which enables access to the second of the resources.

12. The computer program product of claim 8, wherein the program code includes further instructions to: inform the key manager that the second service is returned to the group of services, which prompts the key manager to provide a replacement access key for the second service, which enables the shared storage to use the replacement access key to validate signed requests to access a second of the resources stored by the shared storage.

13. The computer program product of claim 8, wherein the program code includes further instructions to:

add an additional service to the group of services, which prompts the key manager to provide an additional access key, to access an additional resource stored by the shared storage, for the additional service; and use, by the additional service, the additional access key to create an additional signing key, which is used sign an additional request, which is sent to the shared storage, which enables access to the additional resource, in response to the additional service receiving the additional access key from the key manager.

14. The computer program product of claim 8, the resource comprises one of a set of similarity groups, a local fingerprint index, a namespace, a local post-deduplication log, or a range of similarity group identifiers, and the shared storage comprises at least one of an object storage, a distributed key value store, or a distributed log.

15. A computer-implemented method for fencing off cluster services based on shared storage access keys, comprising:

prompting a key manager to provide access keys, to access resources stored by a shared storage, for a group of services hosted by nodes of a cluster;

using, by a first service of the group of services, a first of the access keys to create a signing key, which is used to sign a request, which is sent to the shared storage, which enables access to a first of the resources, in response to the group of services receiving the access keys from the key manager;

informing the key manager that a second service is removed from the groups of services, which prompts the key manager to invalidate use of an access key provided for the second service, in response to detecting that the second service of the group of services becomes unavailable for the cluster; and using, by the first service, the first of the access keys to access the first of the resources, after the key manager invalidates the use of the access key provided for the second service.

16. The computer-implemented method of claim 15, wherein prompting the key manager to provide access keys prompts the shared storage to use the access keys to validate signed requests to access the resources stored by the shared storage, and a policy associated with the group of services specifies permissions for the services in the group of service to access specific resources stored by the shared storage.

17. The computer-implemented method of claim 15, wherein the computer-implemented method further comprises:

reassigning a second of the resources, stored by the shared storage and assigned to the second service, to another service in the group of services; and using, by the other service, another access key to create another signing key, which is used to sign another request to access the second of the resources, which is sent to the shared storage, which enables access to the second of the resources.

18. The computer-implemented method of claim 15, wherein the computer-implemented method further comprises: informing the key manager that the second service is returned to the group of services, which prompts the key manager to provide a replacement access key for the second service, which enables the shared storage to use the replacement access key to validate signed requests to access a second of the resources stored by the shared storage.

19. The computer-implemented method of claim 15, wherein the computer-implemented method further comprises:

adding an additional service to the group of services, which prompts the key manager to provide an additional access key, to access an additional resource stored by the shared storage, for the additional service; and using, by the additional service, the additional access key to create an additional signing key, which is used sign an additional request, which is sent to the shared storage, which enables access to the additional resource, in response to the additional service receiving the additional access key from the key manager.

20. The computer-implemented method of claim 15, the resource comprises one of a set of similarity groups, a local fingerprint index, a namespace, a local post-deduplication log, or a range of similarity group identifiers, and the shared storage comprises at least one of an object storage, a distributed key value store, or a distributed log.

* * * * *